United States Patent [19]

Smith

[11] 3,946,658
[45] Mar. 30, 1976

[54] PEELING APPARATUS FOR FRUIT AND VEGETABLE ARTICLES

[75] Inventor: Traver J. Smith, San Jose, Calif.

[73] Assignees: Genevieve I. Hanscom (formerly Genevieve I. Magnuson), Robert Magnuson, Lois J. Thomson (formerly Lois J. Duggan), as Trustees of Estate of Roy M. Magnuson; part interest to each

[22] Filed: Dec. 26, 1973

[21] Appl. No.: 428,208

[52] U.S. Cl. .................. 99/627; 99/623; 99/630
[51] Int. Cl.² .................. A23N 7/00; A23N 7/02
[58] Field of Search ............ 99/586, 623, 625, 627, 99/634, 617, 626, 620, 621, 630; 17/11

[56] References Cited
UNITED STATES PATENTS

| | | | |
|---|---|---|---|
| 2,146,267 | 2/1939 | Perez | 99/626 |
| 2,433,730 | 12/1947 | Bridge | 99/626 |
| 3,134,413 | 5/1964 | Dorsa | 99/627 |

*Primary Examiner*—Robert W. Jenkins
*Assistant Examiner*—James A. Niegowski
*Attorney, Agent, or Firm*—Naylor, Neal & Uilkema

[57] ABSTRACT

A peeling apparatus for fruit and vegetable articles, the skin of which has been treated to facilitate peeling. The apparatus comprises adjacent elongate rolls which are spaced from one another by a distance less than the diameter of the article to be peeled. One of the rolls has, extending therefrom, a plurality of studs of substantial length and the other has, extending therefrom, studs of relatively short length. The rolls are rotated as articles to be peeled are supported on and moved longitudinally of the rolls and, thus, the treated skin is abraded off by the studs. Because the studs are of different lengths, different amounts of force are applied to the skin and the relatively long studs reach otherwise inaccessible portions of the skin.

7 Claims, 5 Drawing Figures

PEELING APPARATUS FOR FRUIT AND VEGETABLE ARTICLES

BACKGROUND OF THE INVENTION

This invention relates to a peeling apparatus for fruits and vegetables and more particularly to such an apparatus that is peculiarly suited for peeling articles having highly irregular surfaces.

High capacity peeling machines have been known for some time, as exemplified in U.S. Pat. Nos. 3,134,413 and 3,566,942. The capacity and efficiency of these machines has been further increased by the development of a peel treating process which includes the steps of subjecting the peel to a lye bath and then exposing it to infrared energy to activate the lye. Such process is disclosed in co-pending application Ser. No. 299,760, filed Oct. 24, 1972 now Pat. No. 3,855,916 issued Dec. 24, 1974.

The machines disclosed in the above-mentioned patents and application operate satisfactorily, but sometimes leave unpeeled areas on fruit and vegetable articles having highly irregular surfaces, such as potatoes, that are knobby and/or have deep growth cracks in the surface thereof.

OBJECTIVES OF THE INVENTION

The present invention provides a peeling apparatus that has certain overall similarities to the prior art referred to above, but which is capable of removing virtually all of the treated peel, even on potatoes that are knobby and/or have growth cracks.

An object of the present invention is to provide an apparatus that efficiently and completely peels potatoes having irregular surface characteristics. This object is achieved by providing at least two elongate rolls, each of which has a cylindric core from which radially extends a plurality of resiliently flexible studs. The studs on one roll are relatively short and the studs on the other roll are relatively long. Because of this form of construction, the space between the cores of two adjacent rolls can be maintained sufficiently small that potatoes will not pass between the rolls, and the length of the relatively long studs can be sufficient to enable them to enter into growth cracks and the re-entrant portions of knobs on potatoes.

Another object of the present invention is to provide improved peeling roll structures that can be incorporated into existing peeling machines without substantial modification thereof.

Other objects, features and advantages will be more apparent after referring to the following specification and the accompanying drawings.

DESCRIPTION OF THE ILLUSTRATED EMBODIMENT

Figure 1:
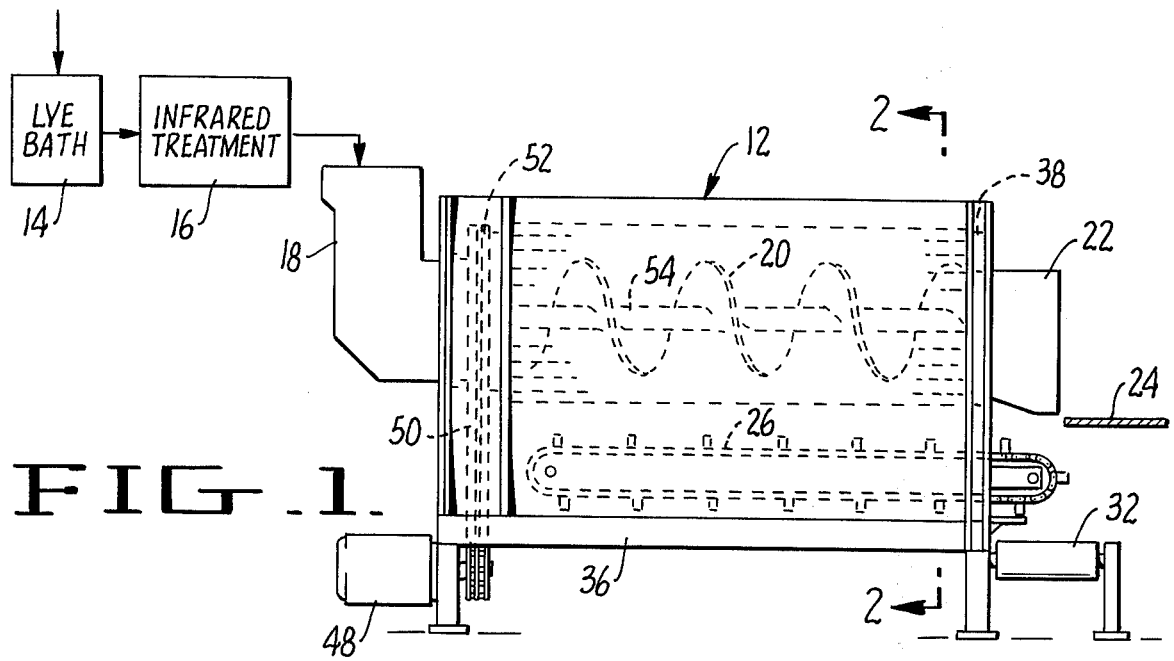
FIG. 1 is a partially schematic side elevational view of a peeling machine according to the present invention.

Referring more particularly to the drawings, reference numeral 12 indicates a high capacity peeling apparatus that employs the present invention. The peeling apparatus, with the exception of the rolls employed therein, is of the same general type disclosed in aforemention copending applicaton Ser. No. 299,760 and is particularly suited for peeling potatoes, the skins of which are treated before introduction into the machine. Such treatment typically includes subjecting the potatoes to a lye bath at 14, after which the lye absorbed in the skin is activated by subjecting the potatoes to infrared treatment at 16. The skins of the treated potatoes are relatively soft and, once so treated, the potatoes are introduced into peeling apparatus 12 through an inlet passageway 18. The potatoes are conveyed through the peeling apparatus by an auger 20 and, after passing through the apparatus, the peeled potatoes are discharged through an outlet 22 onto a conveyor 24. Peels removed from the potatoes are thrown from the apparatus in particulate form and collected in a rotating housing 30, from whence they are removed by a sweeping conveyor 26 and transferred to a discharge conveyor 32.

The housing 30 is of an open-ended cylindrical configuration and extends around the peeling rolls of the apparatus in coextensive relationship thereto to receive peel particles thrown from the rolls. Bearings (not illustrated) mounted on a frame 36 support the housing for rotation about its longitudinal axis. Within the housing 30, and above the central axis thereof, there are a pair of annular plates 38, one of which may be clearly seen in FIG. 2. The plates 38 are disposed in alignment with one another at opposite ends of housing 30 and define confronting pairs of journals for supporting roll shafts 40 and 42. The shafts extend between the annular plates 38 and each shaft is provided with a drive pinion 44 which meshes with a ring gear 46. Ring gear 46 can be stationary or can be rotatively driven by a motor 48 through a chain-sprocket drive 50. Annular plate 38 may be similarly driven by a chain-sprocket drive 52.

Auger 20 is supported within the cylindric volume defined by the roll shafts 40 and 42. A shaft 54 mounts and drives the auger so as to convey articles within said volume from left to right, as viewed in FIG. 1. Thus, auger 20 carries the fruit or vegetable articles through the cylindric volume defined by the shafts 40 and 42 as the shafts are both rotated about their own axes and through a cylindric path corresponding to annular plate 38.

The schematic illustration of the apparatus 12 appearing in FIG. 1 and the foregoing brief description of this apparatus and its mode of operation is simply intended to be illustrative of the type of equipment with which the present invention is employed. As has been acknowledged, this type of equipment was known prior to the present invention, as exemplified by the disclosure of aforementioned application Ser. No. 299,760. Accordingly, a highly detailed description and illustration of the apparatus is not here necessary.

Figure 2:
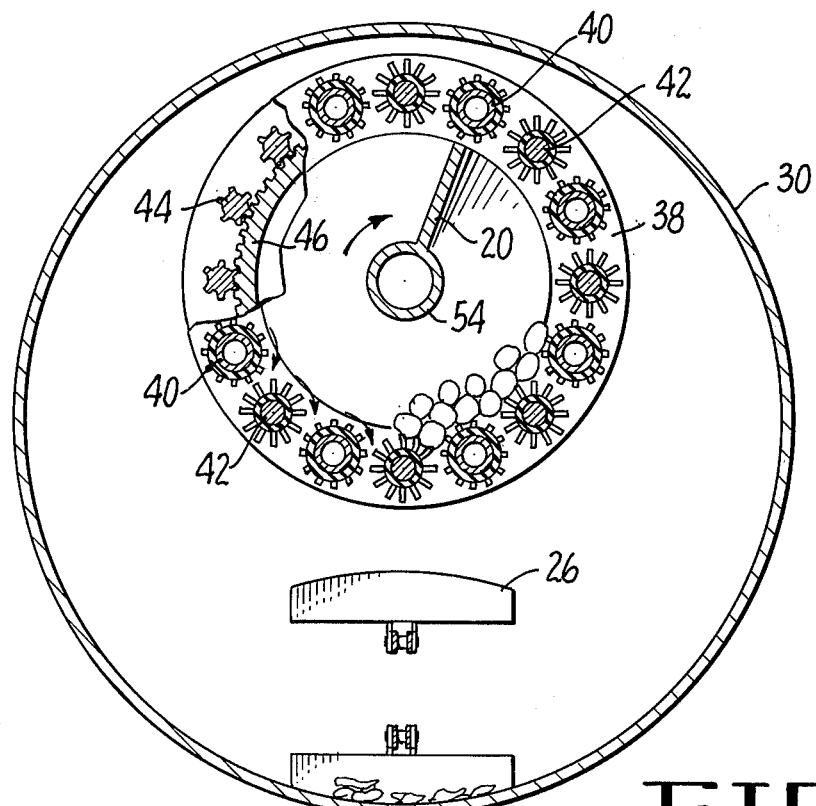
FIG. 2 is a cross-sectional view at enlarged scale, taken on the plane designated by line 2—2 in FIG. 1.
Figure 3:
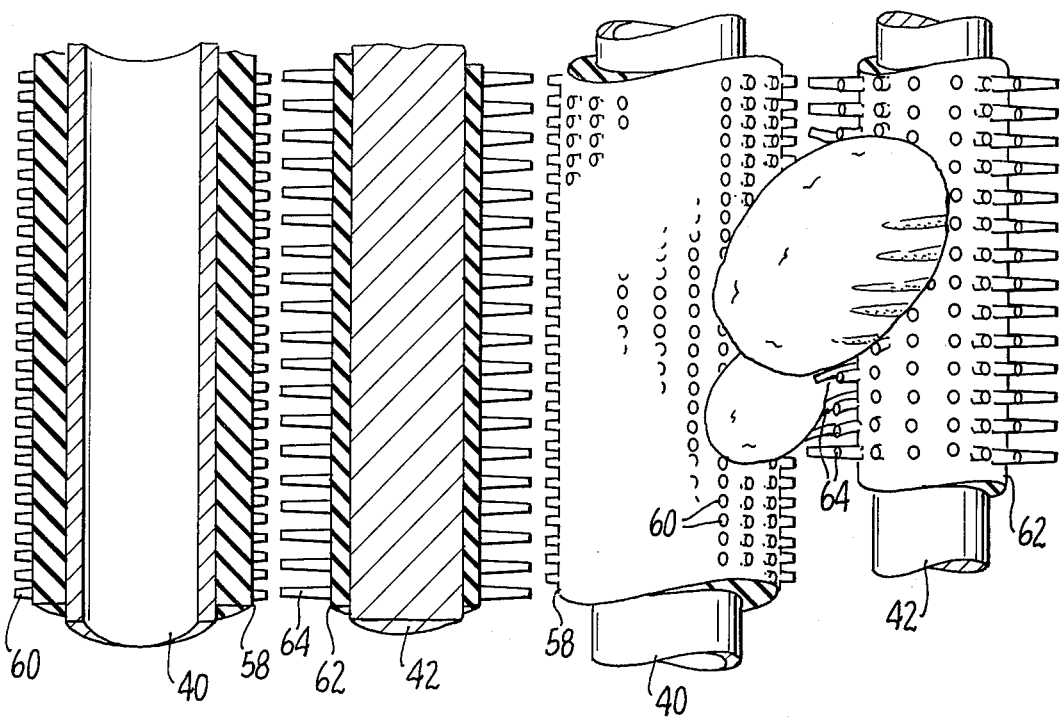
FIG. 3 is a fragmentary view showing portions of four rolls constructed according to the invention.

From FIGS. 2 and 3, it can be seen that the shafts 40 and 42 alternate around the periphery of annular plate 38. On each shaft 40 is mounted a concentric cylindric core 58, from the surface of which extends in a radial direction a plurality of relatively short studs 60. Core 58 and studs 60 are preferably integrally molded of soft resilient material, such as rubber, in order that damage to the fruit or vegetable pieces moving therealong is minimized.

Each shaft 42 has a cylindric core 62 thereon, from which core there extends in a radial direction a plurality of relatively long resilient studs 64. The core 60 and the studs 62 are preferably integrally molded from the same type of resilient material used for the core 58 and studs 60.

Figure 4:
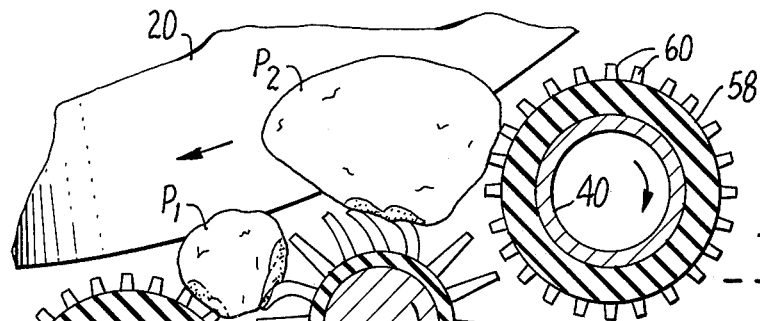
FIG. 4 is an enlarged view of a fragment of FIG. 2, showing the rolls of the present invention acting on regularly shaped articles; and, FIG. 5 is a view similar to FIG. 4, showing the rolls of the invention acting on potatoes with growth cracks and knobs.
Figure 5:
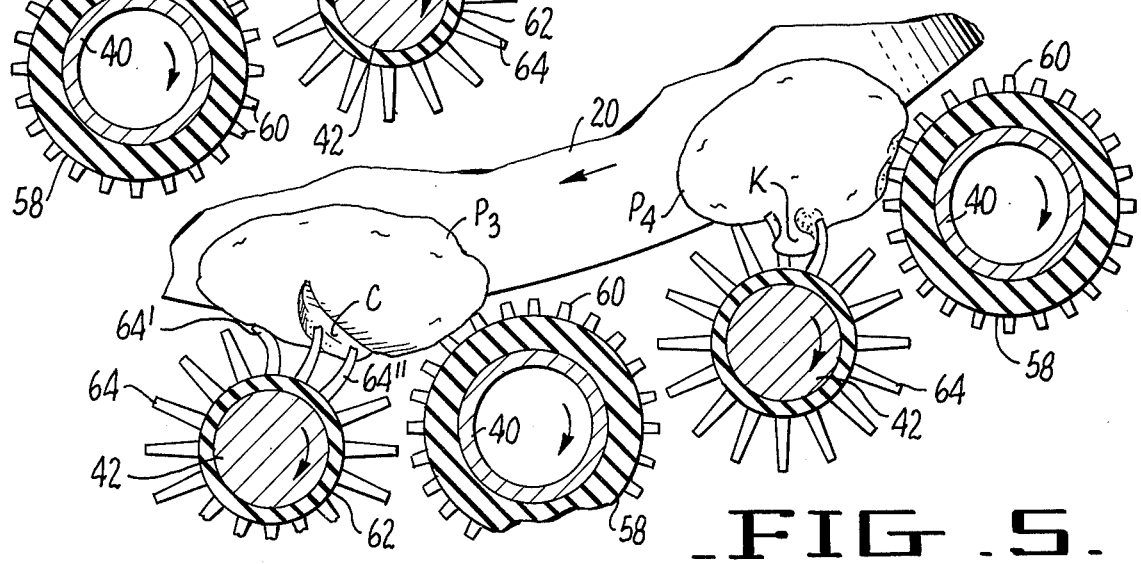

As seen most clearly in FIGS. 3, 4 and 5, the space between the exterior surface of the cylindric core 58 and the external surface of the cylindric core 62 is uniform throughout the peeling apparatus. The apparatus is dimensioned so that said space, sometimes referred to as the "core clearance", is somewhat less than the minimum dimension of articles introduced into the apparatus for peeling. For example, in one apparatus designed according to the present invention the core clearance between the external surfaces of adjacent cores 58 and 62 is 1⅞ inches. Such exemplary apparatus is intended for use with No. 2 potatoes, which are potatoes having a minimum dimension of at least 2 inches. Accordingly, articles moving over the peeling roll are confined within the cylindric volume defined by the rolls and cannot be drawn between adjacent rolls. The rolls of the exemplary apparatus each have an overall diameter of about 4⅜ inches and the journals in plates 38 are spaced at intervals of about 4⅝ inches so that the distal ends of studs 60 and 64 do not contact one another. In the exemplary apparatus, studs 60 are ¼ inch in length and studs 64 are 1¼ inches in length.

FIGS. 3, 4 and 5 also illustrate that the sum of the radial length of the short studs 60 and the radial length of studs 64 is less than the core clearance between adjacent rolls. Because of this dimensional differential, there is a space between the distal ends of the studs on adjacent rolls in order that the studs can return to a radial position, except when they are distorted by contact with a potato piece. The space between the distal ends of the adjacent studs also facilitates the discharge of peel particles from the cylindric volume defined by the peeling rolls and assures that the studs of adjacent rolls will not abrade or become tangled with one another. The latter characteristic is particularly important, as the rolls operate at relatively high rpm (e.g. 800 rpm) and are subject to high acceleration forces.

In operation, the elements are driven in the directions indicated by arrows in FIGS. 2, 4 and 5. As treated potatoes are introduced into inlet passageway 18, the potatoes are engaged by auger 20 and moved through the apparatus, i.e., toward the right as viewed in FIG. 1. Individual potatoes, such as those indicated in FIGS. 4 and 5, at $P_1$, $P_2$, $P_3$ and $P_4$, are gravity biased and tumble into contact with studs 60 and 64 on the respective rolls. Potato $P_1$ represents the approximate minimum size potato piece that will pass through the apparatus without danger of falling or being drawn between adjacent rolls. This is assured because the core clearance between adjacent cores 58 and 62 is less than the smallest dimension of such potato piece.

As a potato passes through the apparatus, it is subjected to relatively forceful abrading action by short studs 60 and relatively gentle abrading action by long studs 62. Long studs 62, because they flex to a greater extent than short studs 60, are capable of entering depressions or like irregularities in the surface of the potato piece and abrading the peel therefrom. Moreover, when a relatively long stud 64 moves from a bent or flexed condition, when in contact with a potato piece, to a straight radially extending position, upon losing contact with the potato piece, the stud snaps so as to throw off any peel fragment thereon. This expedites discharge of the peel particles from the cylindric peeling zone defined by the rolls.

A relatively large regularly shaped potato $P_2$ is subjected to similar abrading action by studs 60 and 64. Relatively long studs 64 are effective in entering small irregularities of the surface of the potato to remove entirely the peel therefrom. Moreover, because of the greater flexibility inherent in relatively long studs 64, as compared with that of short studs 60, there is a differential force applied to opposite portions of the potato which causes the potato to tumble and thereby exposes all regions of the potato surface to the abrading action of studs 60 and 64.

Potato $P_3$ exemplifies a potato which has a substantial growth crack C in the surface thereof. Potatoes with growth cracks are not suitable for the ordinary retail distribution channels, but are entirely satisfactory for french fries and dehydration. FIG. 5 illustrates how the relatively long studs 64 enter into the deepest recesses of the crack and remove the peel therefrom. Note particularly relatively long stud 64' which, because of its length, can easily flex and permit the adjacent studs 64'' to enter growth crack C. Because, as indicated in FIG. 3, studs 64 are continuous along the entire length of the roll, the surface of growth crack C will be subjected to many abrading operations by the relatively long studs as the potato piece transverses the apparatus.

Potato $P_4$ exemplifies a potato with a protuberance or knob K. Because of the length and flexibility of stud 64, the entire surface of the potato and the knob are abraded. Even the re-entrant region at the portion of the knob, adjacent the main body of the potato piece $P_4$ is reached by the relatively long flexible stud 64. The relatively smooth portions of the potato piece are acted on continuously, both by relatively short studs 60 and by relatively long studs 64, so that all portions of the surface are peeled.

The relative speeds of roll rotation with respect to auger rotation and speed of rotation of annular plates 38 can be adjusted to achieve virtually any desired peeling performance. The presence of studs of unequal length assures that virtually all portions of the potato surface will be abraded at least once, and typically numerous times as the potato traverses the apparatus. The output product of the apparatus of this invention is substantially clean and sound and ideally suited for efficient use in further processing.

The rolls 40 and 42 can be installed in existing machines which originally employed more conventional brush or abrasive rolls or studded rolls of uniform core diameter. Thus, existing machines can be modified without undue expense to achieve the advantages afforded by the present invention.

Although one embodiment of the invention has been shown and described, it will be obvious that other adaptions and modifications can be made without departing from the true spirit and scope of the invention.

What is claimed is:

1. Apparatus for peeling fruit and vegetable pieces comprising first and second elongate rolls, said first roll having a first generally cylindric core surface and a plurality of first resilient studs projecting radially outward from said first core surface, said second roll having a second generally cylindric core surface and a plurality of second resilient studs projecting radially outward from said second core surface, means for supporting said rolls in parallel relation for rotation about their respective longitudinal axes, said roll supporting means spacing said rolls from one another so that the space between said first and second core surfaces is less than the minimum diameter of the pieces to be peeled, said first studs having a length less than said second studs and second studs having a length greater than one-half the minimum diameter of the pieces to be peeled, the sum of the lengths of said first and second studs being less than the space between said core surfaces, and means for rotatively driving said rolls in a direction such that the studs on at least one of said rolls move inward of the space between said rolls.

2. Apparatus, according to claim 1, wherein said roll supporting means is arranged to support said rolls so that the longitudinal axes thereof are substantially horizontal.

3. Apparatus, according to claim 1, wherein said first and second cylindric surfaces are spaced from one another by about 1⅞ inches, wherein said first studs have a radial length of about ¼ inch and wherein said second studs have a radial length of about 1¼ inches.

4. Apparatus, according to claim 1, wherein the overall diameter of said first roll is equal to the overall diameter of said second roll and wherein said second studs flex by a greater amount than said first studs so as to apply differential forces to the piece so as to cause the piece to tumble.

5. Apparatus, according to claim 1, wherein said roll supporting means includes a pair of spaced apart annular plates, said plates each defining an equal plurality of uniformly spaced apart journals arranged in a circular pattern therearound, said first and second rolls extending between said plates and being supported in pairs of said journals, said apparatus including a plurality of third and fourth rolls substantially identical to respective said first and second rolls, said third and fourth rolls being disposed in alternation in said journals around said annular plates so as to define a cylindric volume bounded by said rolls.

6. Apparatus, according to claim 5, wherein said roll driving means drives said first, second, third and fourth rolls in the same rotative direction so that opposite sides of a piece supported between a pair of adjacent rolls are subjected to oppositely directed abrading forces by studs on respective said adjacent rolls.

7. Apparatus for peeling fruit and vegetable pieces comprising a plurality of first and second elongate rolls, means for supporting said rolls in parallel uniformly spaced apart relation in a cylindric pattern in which said first rolls alternate with said second rolls around said pattern, said first rolls each having a generally cylindrical core with a plurality of first resilient studs projecting radially outward therefrom and said second rolls each having a generally cylindrical core with a plurality of second resilient studs projecting radially therefrom, the distance between the cores of adjacent rolls being less than the minimum diameter of the pieces to be peeled and said first studs having a length less than said second studs and said second studs having a length greater than one-half the minimum diameter of the pieces to be peeled, said studs having lengths such that the radial extremities of said first studs are spaced apart from the radial extremities of said second studs, and means for rotatively driving said rolls about their respective axes in the same direction.

* * * * *